United States Patent [19]

Crane et al.

[11] Patent Number: 5,348,052
[45] Date of Patent: Sep. 20, 1994

[54] MULTI-LAYERED TRANSLATED RIB-STIFFENED COMPOSITE HOLLOW CYLINDER ASSEMBLY

[75] Inventors: Roger M. Crane, Arnold; D. Michael Bergen, Grasonville, both of Md.

[73] Assignee: The United States of America as represented by the Secretary of the Navy, Washington, D.C.

[21] Appl. No.: 128,785

[22] Filed: Sep. 30, 1993

Related U.S. Application Data

[62] Division of Ser. No. 836,895, Feb. 19, 1992, Pat. No. 5,261,616.

[51] Int. Cl.⁵ ............................................. F16L 11/08
[52] U.S. Cl. .................................... 138/174; 138/111; 138/172; 138/101
[58] Field of Search .............. 138/174, 129, 132, 130, 138/140, 172, 111, 109; 242/7.21, 7.22, 7.23; 68/198, 189

[56] References Cited

U.S. PATENT DOCUMENTS

| | | | |
|---|---|---|---|
| 3,813,098 | 5/1974 | Fischer et al. | 242/7.22 |
| 3,874,970 | 4/1975 | Dunn | 156/169 |
| 4,080,915 | 3/1978 | Bompard et al. | 242/7.21 X |
| 4,089,719 | 5/1978 | Sundell | 242/7.22 X |
| 4,118,262 | 10/1978 | Abbott | 242/7.21 X |
| 4,230,293 | 10/1980 | Hamm et al. | 138/172 X |
| 4,270,710 | 6/1981 | Ono | 68/198 X |
| 4,383,554 | 5/1983 | Merriman | 138/174 X |
| 4,427,033 | 1/1984 | Ege | 138/174 X |
| 4,541,887 | 9/1985 | Carter | 242/7.22 X |
| 4,621,508 | 11/1986 | Baxley, Jr. et al. | 68/198 |
| 4,633,568 | 1/1987 | Marchesi et al. | 242/7.22 X |
| 4,823,565 | 4/1989 | Hahm | 68/198 |
| 4,834,825 | 5/1989 | Adams et al. | 138/112 X |
| 4,875,361 | 10/1989 | Sharp | 220/445 X |
| 4,923,081 | 5/1990 | Weaver et al. | 220/72 |
| 4,948,007 | 8/1990 | Berg et al. | 220/5 A |
| 4,962,650 | 10/1990 | Hahm | 68/198 |
| 5,020,358 | 6/1991 | Sharp | 220/445 X |
| 5,261,462 | 11/1993 | Wolfe et al. | 138/174 X |

*Primary Examiner*—David A. Scherbel
*Assistant Examiner*—Patrick F. Brinson
*Attorney, Agent, or Firm*—Howard Kaiser

[57] ABSTRACT

A multiple-layered, translatedly rib-stiffened, composite hollow cylinder and method for fabrication thereof utilizing filament winding techniques known in the art. An inner skin is wound over a mandrel; then, circumferential ribs are wound over the inner skin, pin rings are placed at the axial ends of the mandrel, longitudinal stringers are engaged with the pin rings and wound over the circumferential ribs, circumferential bands are wound near the axial ends over the longitudinal stringers, and another skin is wound over the circumferential bands and longitudinal stringers; these steps, commencing with the winding of circumferential ribs and concluding with the winding of an additional skin, are repeated as many times as desired, each repetition forming an additional layer, with the circumferential ribs for each additional layer being longitudinally staggered in relation to the circumferential ribs for the previous layer. The cylinder in accordance with this invention is a superior enclosure in terms of mechanical vibrational energy dissipation, directionally controllable thermal energy transmission, and structural damage tolerance; moreover, it advantageously permits a continuous fabrication procedure.

14 Claims, 6 Drawing Sheets

MULTI-LAYERED TRANSLATED RIB-STIFFENED COMPOSITE HOLLOW CYLINDER ASSEMBLY

The invention described herein may be manufactured and used by or for the Government of the United States of America for governmental purposes without the payment of any royalties thereon or therefor.

This application is a division of application No. 07/836,895, filed Feb. 19, 1992, now U.S. Pat. No. 5,261,616.

BACKGROUND OF THE INVENTION

The present invention relates to composite hollow cylindrical structures, more particularly to composite hollow cylindrical structures which are rib-stiffened and to filament winding methods for fabrication thereof.

Filament winding is a technique which is known in the art for the manufacture of cylindrical structures (e.g., tubes and pipes), spherical structures, and other surfaces of revolution. Typically, the filament winding process involves utilization of a resin bath through which dry fibers are passed and then wound; this type of filament winding is known as "wet winding." In this technique the wind angle, band width and tow tension are controlled. Incorporated herein by reference is an informative text on fiber composites: Agarwal, Bhagwan D., and Broutman, Lawrence J., *Analysis and Performance of Fiber Composites*, 2nd Ed., John Wiley & Sons, Inc., New York, 1990; see, especially, section 2.3.1.3 "Filament Winding," pp. 42–44.

Filament winding has been used by the United States Navy for various applications. For example, a wet winding procedure has been utilized by the U. S. Navy for the Advanced Unmanned Search System Vehicle (AUSS). The U.S. Navy has also utilized a wet winding procedure in the fi lament winding process for the manufacturing of the Composite Propeller Drive Shaft.

Manufacture of various types of composite structures having ribs or stiffeners is known in the art. In the manufacturing process for rib-stiffened flat structures, what is generally involved is the separate manufacture of the ribs and of the face sheets, followed by secondary bonding.

A rib-stiffened configuration has also been considered for cylindrical applications. A typical approach for achieving a rib-stiffened cylindrical design involves first winding ribs onto a mandrel which has rib grooves machined in it. After the ribs are wound or fabricated, the rest of the cylindrical form is wound. The mandrel, which is typically sectional, is then disassembled and the cylinder is removed. With this type of design, however, internal connections are made either to the ribs or the skin itself; hence, there is a direct path for vibration energy to propagate from the interior to the exterior of the structural form. This approach is thus deficient for applications in which maximization of energy dissipation from the inside to the outside of the cylinder is desired.

A process used in the filament winding of rib-stiffened cylinders which is similar to the one described above for flat shape applications is disclosed in a publication, incorporated herein by reference, from a 1986 Society of Manufacturing Engineers proceeding. See Harruff, P., Tsuchiyama T., and Spicola, F. C., "Filament Wound Torpedo Hull Structures," Fabricating Composites '86 Proceedings, Society of Manufacturing Engineers, Sept. 8-11, 1986, Baltimore, Md. This process requires the fabrication and curing of the skin and stiffeners, followed by the machining of the cylinder inner diameter and the rib outer diameter to high tolerance. After this is done, the ribs are carefully positioned and adhesively bonded to the skin. The materials used for the application disclosed by Harruff et al., it is noted, are a prepreg tape for the cylinder wall and a wet winding system for the ribs.

As aforementioned herein, wet winding procedures have been used by the U.S. Navy for the Advanced Unmanned Search System Vehicle (AUSS) and the Composite Propeller Drive Shaft. The AUSS was a cylinder of constant thickness and no ribs. See Technical Report 1245, August 1988, Stachiw, J. D., and Frame, B., "Graphite-Fiber-Reinforced Plastic Pressure Hull Mod 2 for the Advanced Unmanned Search System Vehicle," Naval Ocean Systems Center, San Diego, Calif., incorporated herein by reference; see therein, especially, pages 16–21, and FIG. 18 on page 54 therein ("Schematic of Winding Operation"). For the manufacture of the Composite Propeller Drive Shaft, dry tows are passed through a resin bath to coat the tows. After tow impregnation they are fed onto the mandrel at various orientations to achieve the desired part. Incorporated herein by reference is Report No. DTRC-PASD-CR-1-88, Contract No. N00167-86-C-0150, Tulpinsky, Joseph F., and May, Marvin C., "Filament Winding Process for Composite Propeller Drive Shaft Sections," October 1986 to October 1987, prepared by Hercules, Inc. for David Taylor Naval Ship R & D Center; see, especially, pages 4–1 through 4–8 therein (Chapter 4.0 "Manufacturing").

The U.S. Air Force used the filament winding technique for the B-1B composite Rotary Launch Tube. Here the winding process utilized prepreg tape in favor of the wet winding technique in order to achieve a tighter control on fabricated properties. Incorporated herein by reference is Peters, S. T., Humphrey, W. D., and Foral, R. F., *Filament Winding, Composite Structure Fabrication*, Society for the Advancement of Material and Process Engineering, Covina, Calif. 1991; see, especially, pages 2-9, 2-12, 11-1 to 11-3.

Although the above-described processes for manufacturing bodies of revolution have achieved satisfactory results, they have generally been discontinuous and time-consuming and have required precision equipment and machining.

OBJECTS OF THE INVENTION

In view of the foregoing, it is a principal object of the present invention to provide an improved rib-stiffened hollow cylinder construction and fabrication methodology.

It is a further object of the present invention to provide an improved hollow cylinder construction and fabrication methodology for use as a mechanical vibrational energy-dissipating enclosure.

Another object of this invention is to provide an improved hollow cylinder construction and fabrication methodology for use as a directionally controllable thermal energy-transmitting enclosure.

A further object of this invention is to provide an improved hollow cylinder construction and fabrication methodology which admits of a continuous fabrication procedure.

Another object of the present invention is to provide an improved hollow cylinder construction and fabrication methodology which would be advantageously suitable for such applications as, e.g., chemical or petrochemical storage tanks, manned or unmanned submersible pressure hulls, manned or unmanned aircraft, and manned or unmanned spacecraft.

SUMMARY OF THE INVENTION

The present invention provides a multiple composite translated rib-stiffened cylinder with hollow core which may be fabricated in an unbroken procedure and is suitably used as a mechanical vibrational energy dissipating enclosure. The multi-cored, rib-stiffened cylindrical design according to this invention is capable not only of dissipating internal mechanical vibrational energy but also of minimizing the energy transmitted to the external environment.

This invention provides a method, using a cylindrical mandrel, for fabricating a translated double rib-stiffened composite cylinder having a hollow core. "Circumferential" winding, as used herein, means in a direction or directions of selected filament orientation or orientations about the circumference of the cylinder. "Longitudinal winding, as used herein, means in the axial or generally axial direction of the cylinder. This method provided by the present invention comprises: Winding circumferentially an inner skin around the cylindrical mandrel; winding circumferentially a plurality of inner circumferential ribs around the inner skin, the inner circumferential ribs spaced apart longitudinally; positioning a pair of inner pin rings at the axial ends of the cylindrical mandrel, one inner pin ring at each axial end, each inner pin ring having a ring portion and a plurality of pins spaced apart circumferentially and projecting radially from the ring portion; winding longitudinally a plurality of inner longitudinal stringers, the inner longitudinal stringers transversely superposed on and contiguous with the inner circumferential ribs, the inner longitudinal stringers engaged with the pins of the inner pin ring and spaced apart circumferentially and correspondingly with the pins of the inner pin ring; winding circumferentially a pair of inner bands, the inner bands located longitudinally inward of and adjacent to the first pin rings; winding circumferentially an intermediate skin around the inner bands and the inner longitudinal stringers; winding circumferentially a plurality of outer circumferential ribs around the intermediate skin, the outer circumferential ribs spaced apart longitudinally and staggeringly with respect to the inner circumferential ribs; positioning a pair of outer pin rings at the axial ends of the cylindrical mandrel, .one outer pin ring at each axial end, each outer pin ring having a ring portion and a plurality of pins spaced apart circumferentially and projecting radially from the ring portion; winding longitudinally a plurality of outer longitudinal stringers, the outer longitudinal stringers transversely superposed on and contiguous with the outer circumferential ribs, the outer longitudinal stringers engaged with the pins of the outer pin ring and spaced apart circumferentially and correspondingly with the pins of said outer pin ring; winding circumferentially a pair of outer bands, the outer bands located longitudinally inward of and adjacent to the outer pin rings; and winding circumferentially an outer skin around the outer bands and the outer axial stringers.

In fact, this invention provides a method, using a cylindrical mandrel, for fabricating a translated rib-stiffened composite cylinder having a hollow core which is multiple-layered. The cylinder can be double-layered, triple-layered, quadruple-layered, quintuple-layered, sextuple-layered, septuple-layered, or layered in any greater multiple. This method comprises: (a) winding circumferentially an inner skin around the cylindrical mandrel, this step (a) forming the inner layer of the composite cylinder; (b) winding circumferentially a plurality of first circumferential ribs around the inner skin, the first circumferential ribs spaced apart longitudinally; (c) positioning a pair of first pin rings at the axial ends of the cylindrical mandrel, one first pin ring at each axial end, each first pin ring having a ring portion and a plurality of pins spaced apart circumferentially and projecting radially from the ring portion; (d) winding longitudinally a plurality of first longitudinal stringers, the first longitudinal stringers transversely superposed on and contiguous with the first circumferential ribs, the first longitudinal stringers engaged with the pins of the first pin ring and spaced apart circumferentially and correspondingly with the pins of the first pin ring; (e) winding circumferentially a pair of first bands, the first bands located longitudinally inward of and adjacent to the first pin rings; (f) winding circumferentially a first outer skin around the first bands and the first axial stringers, these steps (b) to (f) inclusive forming the first outer layer of the composite cylinder, the first outer layer including the first circumferential ribs, the first pin rings, the first longitudinal stringers, the first bands, and the first outer skin; (g) winding circumferentially a plurality of second circumferential ribs around the second skin, the second circumferential ribs spaced apart longitudinally and staggeringly with respect to the first circumferential ribs; (h) positioning a pair of second pin rings at the axial ends of the cylindrical mandrel, one second pin ring at each axial end, each second pin ring having a ring portion and a plurality of pins spaced apart circumferentially and projecting radially from the ring portion; (i) winding longitudinally a plurality of second longitudinal stringers, the second longitudinal stringers transversely superposed on and contiguous with the second circumferential ribs, the second longitudinal stringers engaged with the pins of the second pin ring and spaced apart circumferentially and correspondingly with the pins of the second pin ring; (j) winding circumferentially a pair of second bands, the second bands located longitudinally inward of and adjacent to the second pin rings; (k) winding circumferentially a second outer skin around the second bands and the second longitudinal stringers these steps (g) to (k) inclusive forming the second outer layer of the composite cylinder, the second outer layer including the second circumferential ribs, the second pin rings, the second longitudinal stringers, the second bands, and the second outer skin; and (1) repeating steps (g) to (k) inclusive any number of times, each repetition of steps (g) to (k) inclusive forming a next outer layer of the composite cylinder, each next outer layer being radially outward of the previous outer layer, the previous outer layer being the radially outermost outer layer prior to the repetition of steps (g) to (k) inclusive, the previous outer layer including the previous circumferential ribs, the previous pin rings, the previous longitudinal stringers, the previous bands, and the previous outer skin, the next outer layer including next circumferential ribs, next pin rings, next longitudinal stringers, next bands, and a next outer skin, the next circumferential ribs spaced apart longitudinally and staggeringly with respect to previous circumferential ribs.

The present invention also provides a multiple-layered, translated rib-stiffened composite cylinder having a hollow core, the composite cylinder being produced by the above-said method for fabricating a translated rib-stiffened composite cylinder having a hollow core which is multiple-layered. The composite cylinder comprises: An inner layer which includes an inner skin; and at least one outer layer, each said outer layer including a plurality of circumferential ribs, a pair of pin rings, a plurality of longitudinal stringers, a pair of bands, and an outer skin.

The multiple-rib cylinder assembly of the present invention, featuring a multiple-layer rib-stiffener configuration, advantageously minimizes the vibrational energy transmitted to the environment from internal vibrating structures. The multiple stiffener design achieves maximum dissipation of vibrational energy from the inside of the cylinder to the outside. Any vibrational energy that is incident at the inner surface is not directly connected to the outer skin. For example, in the case of the double stiffener design of this invention, the vibrational energy is initially passed through to the middle skin at the rib-stiffeners, which in effect is a reduced energy source. After this energy is passed onto the middle skin, it again can only pass onto the outer skin by traveling through the rib-stiffeners. Once it is passed through these rib-stiffeners, the outer skin is excited. There is dissipation in the energy that is transmitted to the outer skin for three reasons. Firstly, there is no direct connection between the source and the outer skin. Secondly, because of the vibration damping of the composite, and the fact that energy is dissipated over a distance, the larger the distance that the vibration travels, the lower the magnitude of the vibration. In this manner, the energy that is finally transmitted to the outer skin is significantly less, which will result in a quieter (and, as the case may be, stealthier) structure. Thirdly, because of the path that the internal vibrational motion must follow, there may be a tendency for conversion of interior longitudinal vibrational motion, which is difficult to dissipate to flexural vibrational motion, which is dissipated rather efficiently by composite materials.

Moreover, the multi-layered, rib-stiffened composite cylinder assembly of the present invention provides for easier thermal management through the use of metallic inner skin with all other parts being composite; alternatively, composite materials such as graphite fibers in an epoxy could also be used for the inner skin for thermal management concerns. In this manner, the heat in the interior of the cylinder can be transmitted to a specific location on the cylinder or can be dissipated to appear to be of other shape than it actually is. This results because the composite is insulating in directions normal to the fiber direction and will not transmit the heat through it. All (or virtually all) of the heat can be made to exit at specific location(s).

Additionally, the present invention features a material winding fabrication methodology which admits of continuous winding and layering. This invention thus provides an efficient fabrication method for making composite cylindrical sections in a continuous process.

It should also be emphasized that the multiple wall construction of the present invention provides a damage-tolerant design. A notable feature of this invention is the multiplicity of layers having rib-stiffeners which are translatedly disposed in relation to the rib-stiffeners of each adjacent layer. The outer skin provides protection to the interior skins from shock or foreign object impact because direct structural connection is minimized; hence, significant catastrophic damage to the rest of the structure is minimized.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
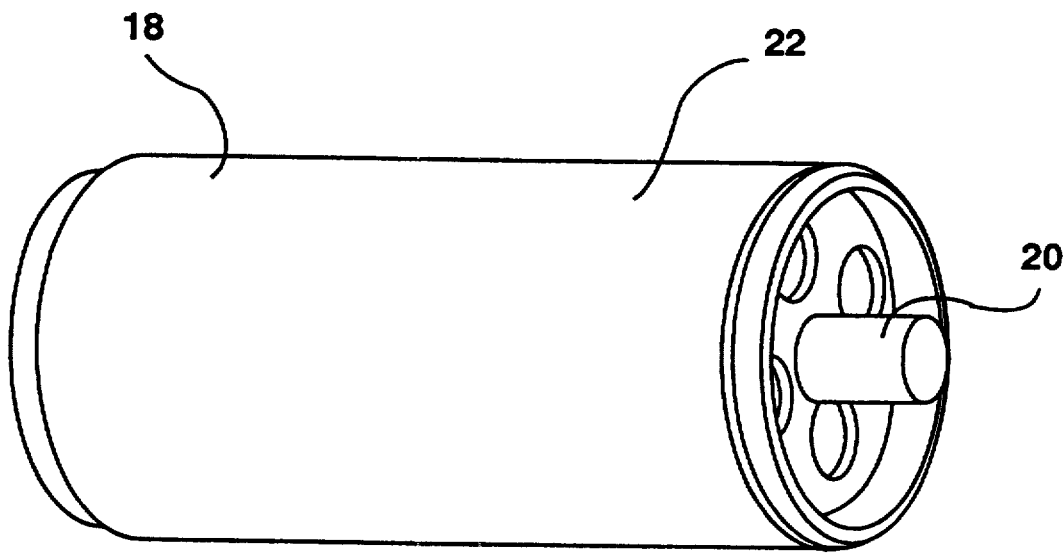
FIG. 1 through FIG. 8 are schematic perspective views representing the steps of the fabrication methodology of the present invention.

Cylindrical workpiece 18, shown in various stages of completion in FIG. 1 through FIG. 8, is outward of and coaxial with mandrel 20. Referring now to FIG. 1, inner skin 22 is made of fibrous material. Unidirectional fibers are wound around cylindrical mandrel 20 to form a continuous skin, inner skin 22. Inner skin 22 of cylinder workpiece 18 has an outer surface defining a cylindrical shape which is coaxial with mandrel 20.

Figure 7:
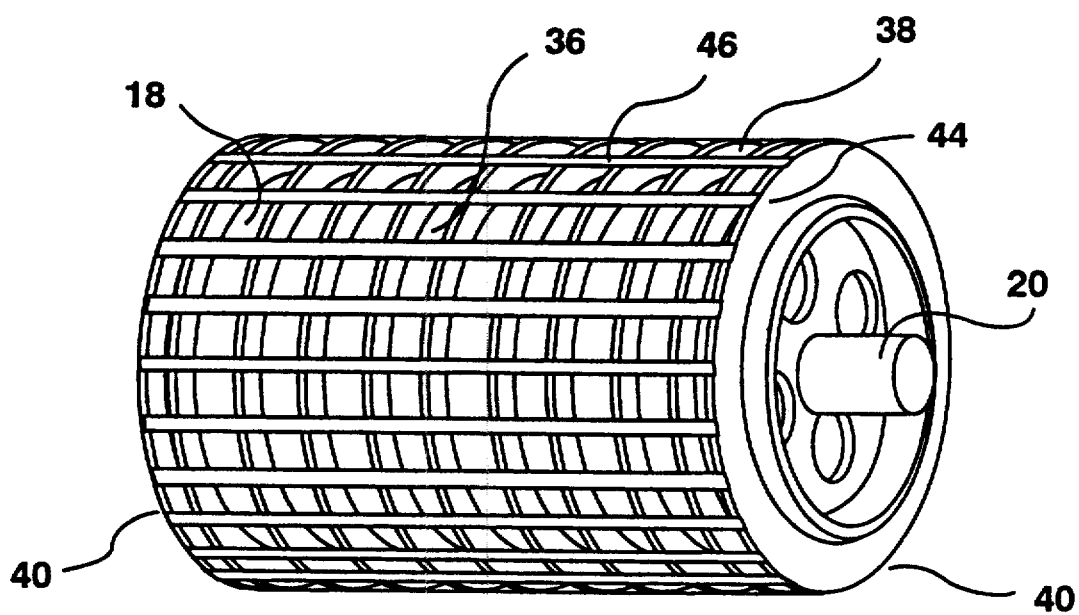

As the term is used herein, a "fibrous" material is fiber, filament or tape of any appropriate material composition. In the context of circumferential winding, for most embodiments of the present invention the fibrous material has a width less than length 1 of completed cylinder 18, shown in FIG. 8; however, for some embodiments, the fibrous material which is circumferentially wound to form inner skin 22 or a subsequent continuous skin is a sheet-like material having a width commensurate with the longitudinal expanse of mandrel 20 and approximately equal to length 1 of completed cylinder workpiece 18. In the context of longitudinal winding, the width of the material being wound is generally normal to the longitudinal expanse of mandrel 20 as well as to the longitudinal expanse of the cylinder workpiece 18; here, a fibrous material has a width less than the circumference of the cylindrical shape along which the fibrous material is being wound. Hence, when the fibrous material is engaged with inner pins 30 and longitudinally wound along the cylindrical shape defined by the outer surfaces of inner circumferential ribs 24, as shown in FIG. 3, the fibrous material has a width less than the circumference of this cylindrical shape corresponding to inner circumferential ribs 24; similarly, when the fibrous material is engaged with outer pins 44 and longitudinally wound along the cylindrical shape defined by the outer surfaces of outer circumferential ribs 38, as shown in FIG. 7, the fibrous material has a width less than the circumference of this cylindrical shape corresponding to outer circumferential ribs 38.

It is emphasized herein that any degree of commonality or differentiation between or among any of the material compositions actually used for the fibrous materials may be appropriate in accordance with a given embodiment of the present invention; hence, use herein, for example, of the terms "first" fibrous material, "second" fibrous material, and "third" fibrous material is not intended to suggest that the "first" fibrous material necessarily is either the same as or different from the "second" fibrous material, or that the "second" fibrous material necessarily is either the same as or different from the "third" fibrous material, or that the "first" fibrous material necessarily is either the same as or different from the "third" fibrous material.

Figure 2:
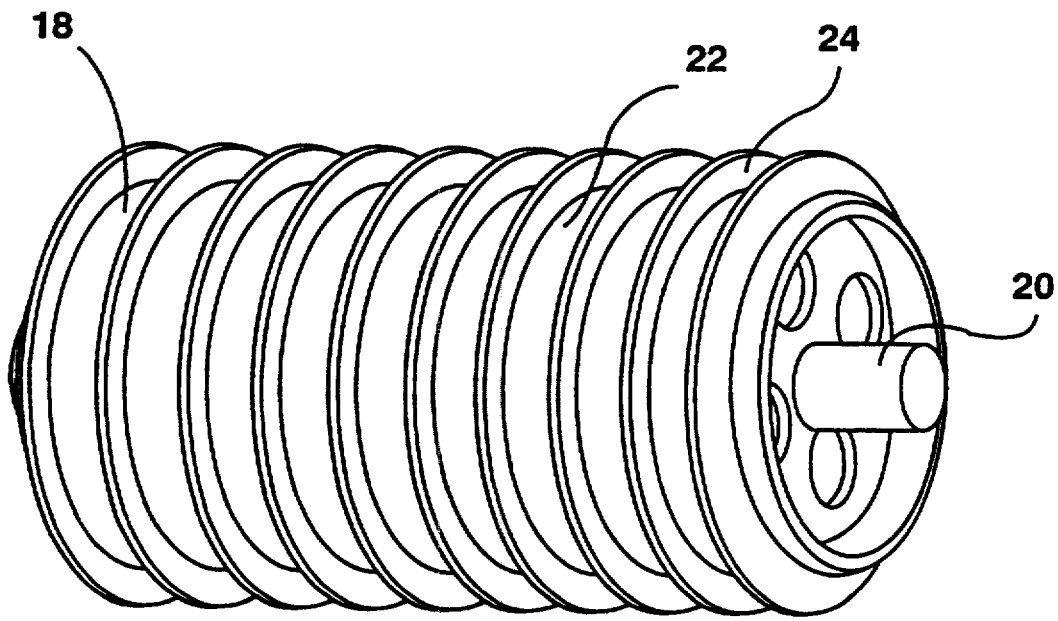

After inner skin 22 of appropriate thickness is wound, inner circumferential ribs 24 running circumferentially around inner skin 22 are wound, using a filament-winding or tape-laying machine. With reference to FIG. 2, a second fibrous material is wound circumferentially around the cylindrical shape defined by the outer surface of inner skin 22 so as to form a plurality of inner circumferential ribs 24 spaced apart axially and having equiradial outer surfaces defining a cylindrical shape which is coaxial with mandrel 20. FIG. 2 schematically illustrates inner circumferential ribs 24 wound over inner skin 22. Inner circumferential ribs 24 can be wound with or without the use of a dissolvable or sectional mold which is placed outside inner skin 22. If a dissolvable or sectional mold is utilized, this is removed after winding inner circumferential ribs 24.

Figure 3:
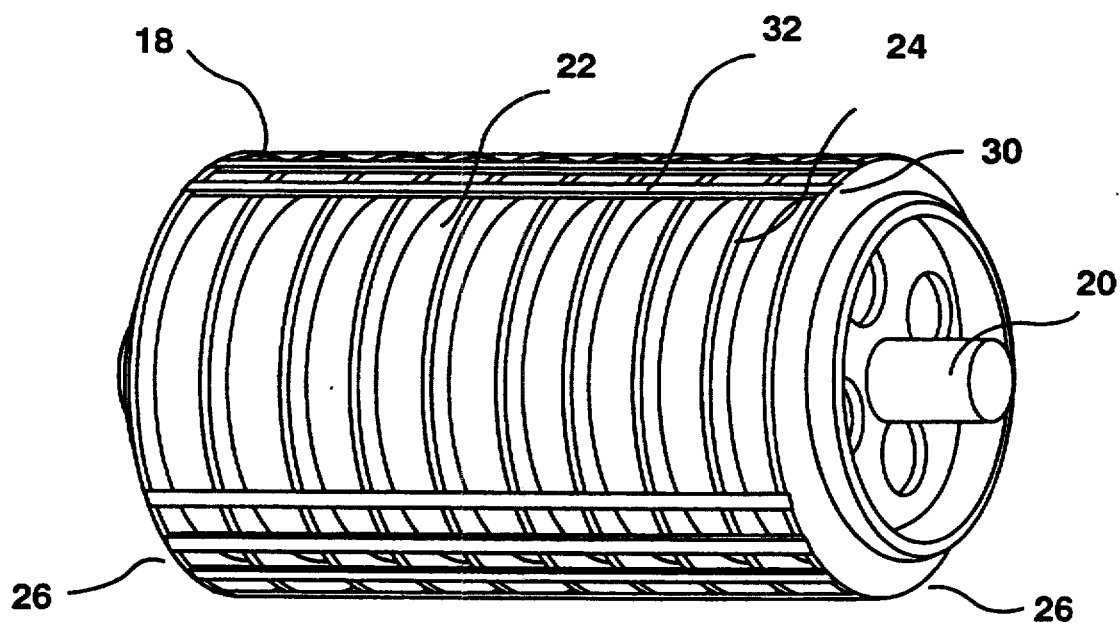
Figure 10:
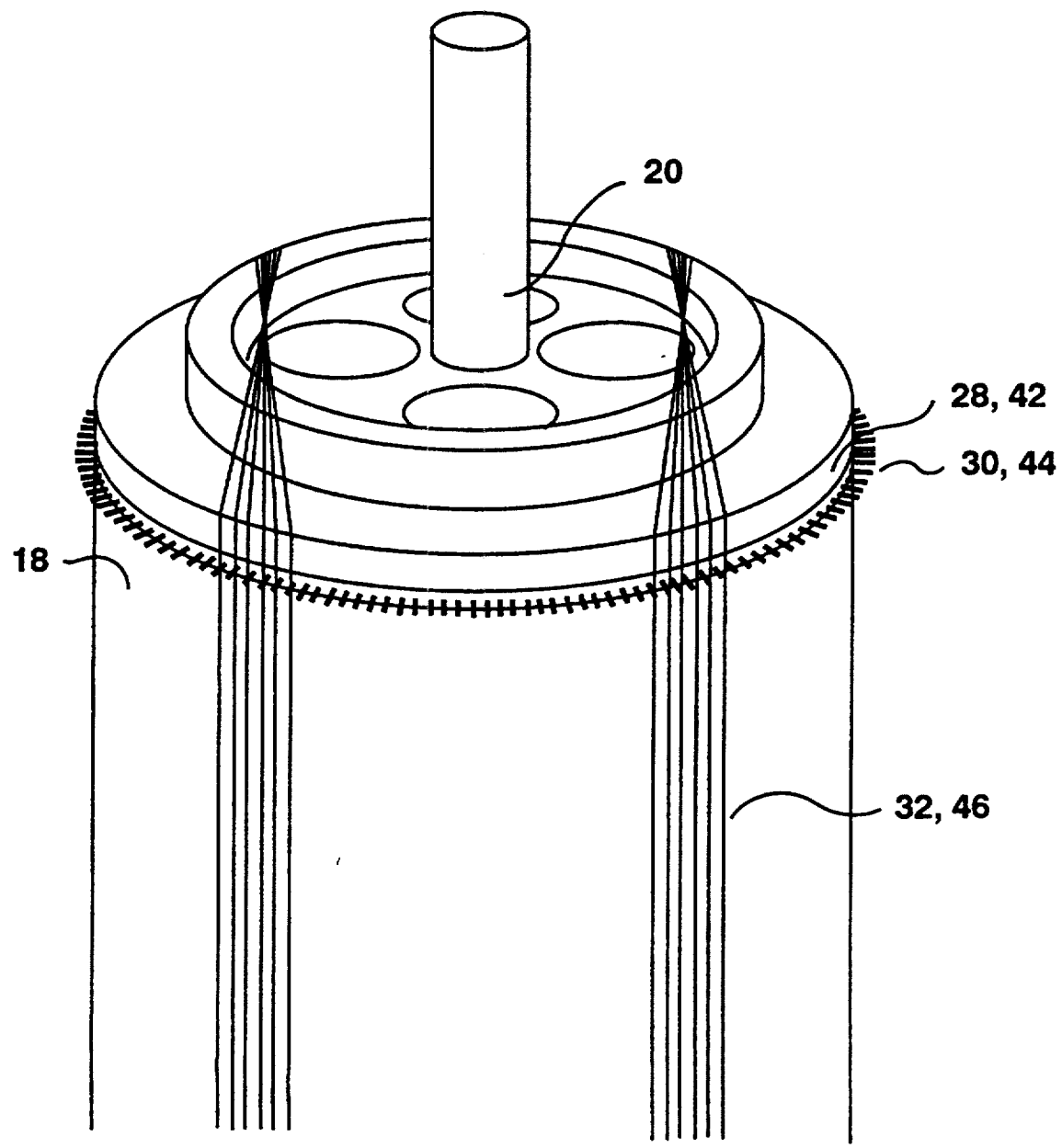
FIG. 10 is a diagrammatic partial perspective detail view of the mandrel and pin ring shown in FIG. 1.

Referring to FIG. 3, two inner pin rings 26 are positioned, one at each axial end of mandrel 20. Each inner pin ring 26 has an inner ring 28 portion and a plurality of inner pins 30 spaced apart circumferentially and projecting radially from inner ring 28, as shown in FIG. 10. Each inner ring 28 has an outer surface defining a cylindrical shape which is coaxial with mandrel 20 and approximately equiradial with the cylindrical shape defined by said outer surfaces of inner circumferential ribs 24.

A third fibrous material is engaged with inner pins 30 and wound longitudinally along the cylindrical shape defined by the outer surfaces of inner circumferential ribs 24 so as to form a plurality of inner longitudinal stringers 32 which are spaced apart circumferentially and correspondingly with inner pins 30 and have equiradial outer surfaces defining a cylindrical shape which is coaxial with mandrel 20.

It is emphasized that the present invention provides a unique methodology of allowing for tape or fiber placement over inner circumferential ribs 24, thus succeeding in winding intermediate skin 36 on top of circumferential ribs 24. Intermediate skin 36 cannot merely be wound directly onto inner circumferential ribs 24, since a continuous surface does not exist onto which the tape or fibers can be positioned. The present invention accomplishes this with the use of two pin rings 26, one positioned at each end of the wound piece. Inner pin rings 26 have a small cylindrical section, inner rings 28, of diameter approximately equal to that of the wound part. A series of inner pins 30, for some embodiments preferably equally spaced apart, extend in the radial direction outward from inner rings 28. Fibers or tapes are wound along the axis of the cylinder at some spacing, for some embodiments preferably about 1 inch, depending on dimensions. As the tape or filament winding machine makes a pass along the axis of the cylinder, the mandrel rotates a specified angular amount and traverses again along the axis of the cylinder. Typically, in the absence of inner pin rings 26, such a fiber or tape position would not remain, since it is not a geodesic path; however, in accordance with this invention, inner pin rings 26 keep the fibers or tapes in their axial position.

Figure 4:
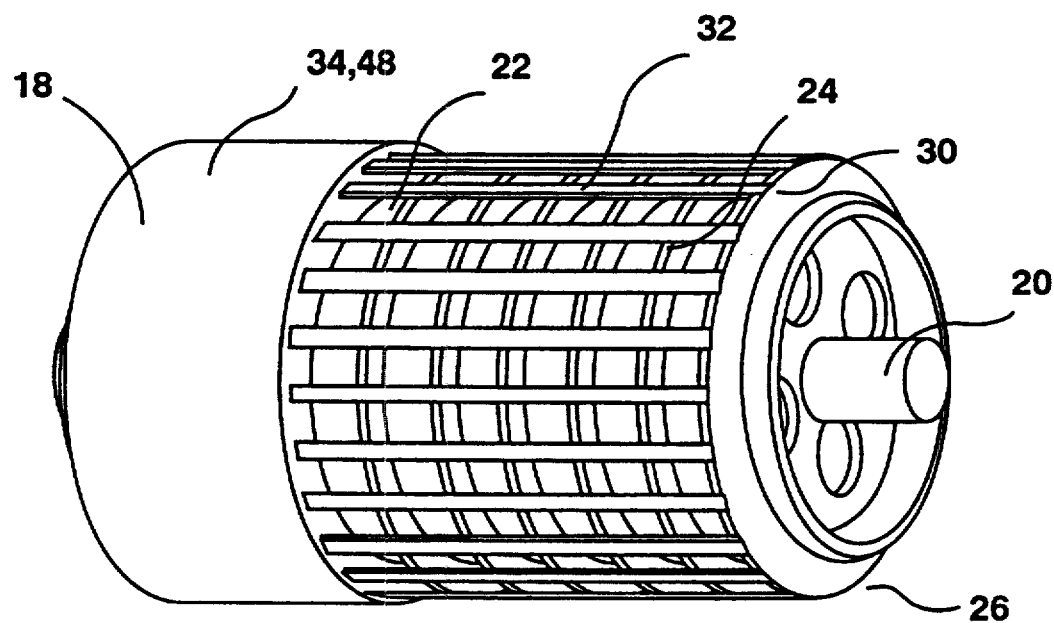

Reference now being made to FIG. 4, a fourth fibrous material is wound circumferentially around the cylindrical shape defined by the outer surfaces of inner longitudinal stringers 32 so as to form a pair of inner circumferential bands 34, (only one of the pair shown in the figure), located longitudinally inward of and adjacent to inner pin rings 26, inner circumferential bands 34 being spaced apart longitudinally and having equiradial outer surfaces defining a cylindrical shape which is coaxial with mandrel 20. Tapes or fibers are wound in the hoop direction at the ends of cylinder workpiece 18 to form inner circumferential bands 34, which provide a net force on inner longitudinal stringers 32 in the radial direction toward the interior of the cylinder.

Figure 5:
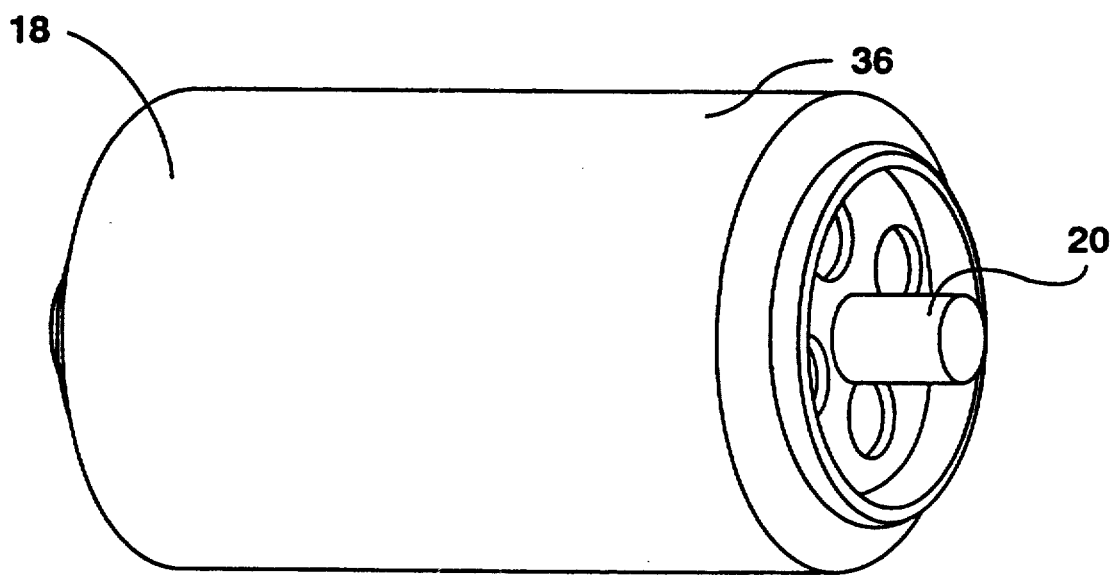

Another continuous skin is wound over top inner longitudinal stringers 32 and inner circumferential bands 34, referring now to FIG. 5. Here, a fifth fibrous material is wound circumferentially around the cylindrical shape defined by the outer surfaces of inner longitudinal stringers 32 and inner circumferential bands 34 so as to form intermediate skin 36 having an outer surface defining a cylindrical shape which is coaxial with mandrel 20.

At this point, referring to FIG. 5, cylinder workpiece 18 comprises inner skin 22, a plurality of inner circumferential ribs 24, a pair of inner pin rings 26, a plurality of inner longitudinal stringers 32, a pair of inner circumferential bands 34, and intermediate skin 36. In order to add another ribbed layer to cylinder workpiece 18, steps pertaining to circumferential winding of ribs, positioning of pin rings, longitudinal winding of longitudinal stringers, circumferential winding of bands, and circumferential winding of a skin, are essentially repeated.

Figure 6:
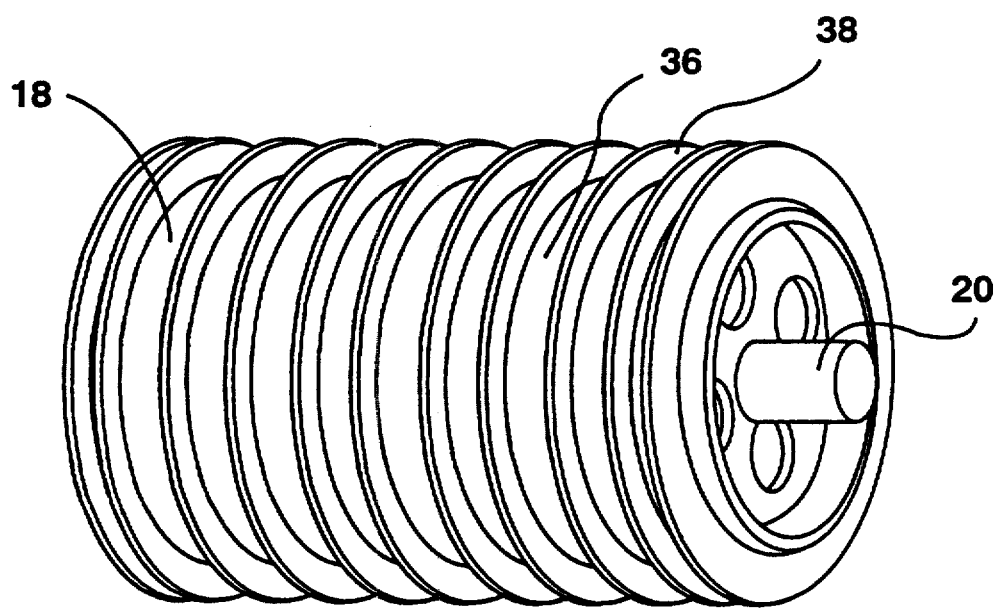
Figure 9:
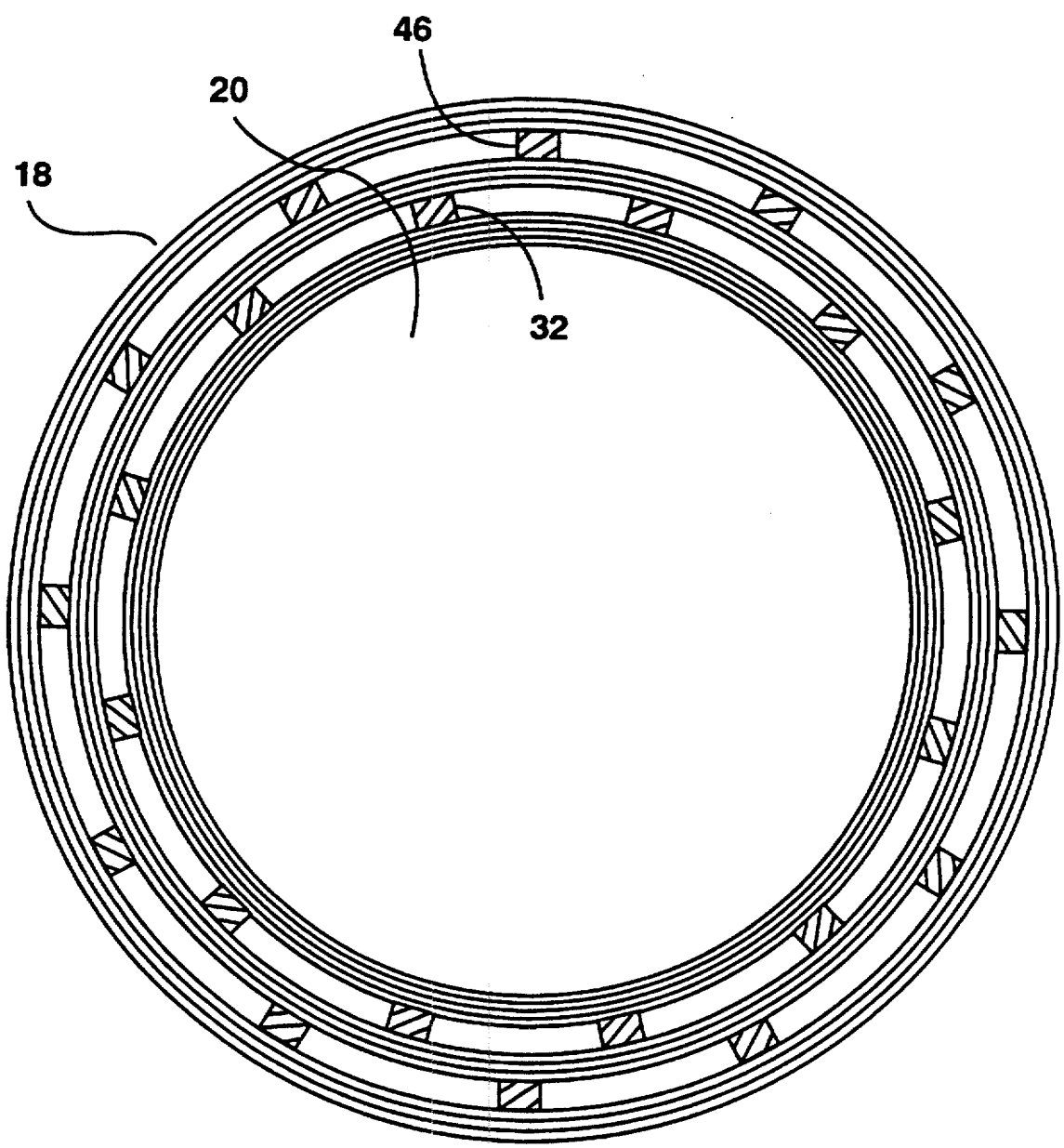
FIG. 9 is a diagrammatic axially transverse sectional view of the double-ribbed composite cylinder of this invention, taken along the plane of line 9—9 in FIG. 8.

Referring to FIG. 6 and FIG. 9, a second set of ribs is wound over the skin, but with their positions displaced relative to the ribs located axially inward thereof. Here a sixth fibrous material is wound circumferentially around the cylindrical shape defined by the outer surface of intermediate skin 36 so as to form a plurality of outer circumferential ribs 38. Outer circumferential ribs 38 are spaced apart longitudinally and staggeringly with respect to inner circumferential ribs 24 and have equiradial outer surfaces defining a cylindrical shape which is coaxial with mandrel 20.

The specific positions of outer circumferential ribs 38 in relation to inner circumferential ribs 24 may be selected in accordance with both acoustical and structural design considerations. Selection of numbers and material compositions of inner circumferential ribs 24 and outer circumferential ribs 38 may also be relevant to these design considerations. For some embodiments, placement of outer circumferential ribs 38 is preferably translatedly uniform in relation to placement of inner circumferential ribs 24. For other embodiments of this invention, outer circumferential bands 38 are positioned variably or randomly in relation to successive inner circumferential ribs 24; in some embodiments and applications variable or random rib translation may provide enhanced vibrational energy dissipation. Also, for many embodiments of this invention inner circumferential ribs 24 and outer circumferential ribs 38 preferably provide stiffening for the composite cylinder with a minimum of weight.

Referring to FIG. 7, two outer pin rings 40 are positioned, one at each axial end of mandrel 20. Each outer pin ring 40 has an outer ring 42 portion and a plurality of outer pins 44 spaced apart circumferentially and projecting radially from outer ring 42, referring again to FIG. 10, which may be viewed as generally representative of the pin ring configuration in accordance with this invention. Each outer ring 42 has an outer surface defining a cylindrical shape which is coaxial with mandrel 20 and approximately equiradial with the cylindrical shape defined by said outer surfaces of outer circumferential ribs 38.

A second set of longitudinal stringers is wound in place with the use of the pin ring assembly, again resulting in a cylinder workpiece 18 structure such as that shown in FIG. 7. Here, a seventh fibrous material is engaged with outer pins 44 and wound longitudinally along the cylindrical shape defined by the outer surfaces of outer circumferential ribs 38 so as to form a plurality of outer longitudinal stringers 46 which are spaced apart circumferentially and correspondingly with outer pins 44 and have equiradial outer surfaces defining a cylindrical shape which is coaxial with mandrel 20.

It is emphasized that the pins for any of the pairs of pin rings in accordance with this invention may be relatively distantly spaced apart, or relatively closely spaced apart, for various embodiments of this invention; hence, the longitudinal stringers which engage a particular pair of pin rings will be correspondingly distantly or closely spaced apart, and may even be contiguous, with respect to each other. Therefore, for example, for some embodiments longitudinal stringers 30 form a continuous or substantially continuous surface if the spacings between pins 30 are sufficiently small and the band widths of longitudinal stringers 32 are sufficiently great; similarly, longitudinal stringers 46 form a continuous or substantially continuous surface if the spacings between pins 40 are sufficiently small and the band widths of longitudinal stringers 46 are sufficiently great.

Reference again being made to FIG. 4, which may be viewed as generally representative of circumferential winding of circumferential bands in accordance with this invention, an eighth fibrous material is wound circumferentially around the cylindrical shape defined by the outer surfaces of outer longitudinal stringers 46 so as to form a pair of outer circumferential bands 48 located longitudinally inward of and adjacent to outer pin rings 40, outer circumferential bands 48 being spaced apart longitudinally and having equiradial outer surfaces defining a cylindrical shape which is coaxial with mandrel 20. Thus, tapes or fibers are again wound in the hoop direction at the ends of cylinder workpiece 18, this time to form outer circumferential bands 48, which provide a net force on outer longitudinal stringers 46 in the radial direction toward the interior of the cylinder.

Figure 8:
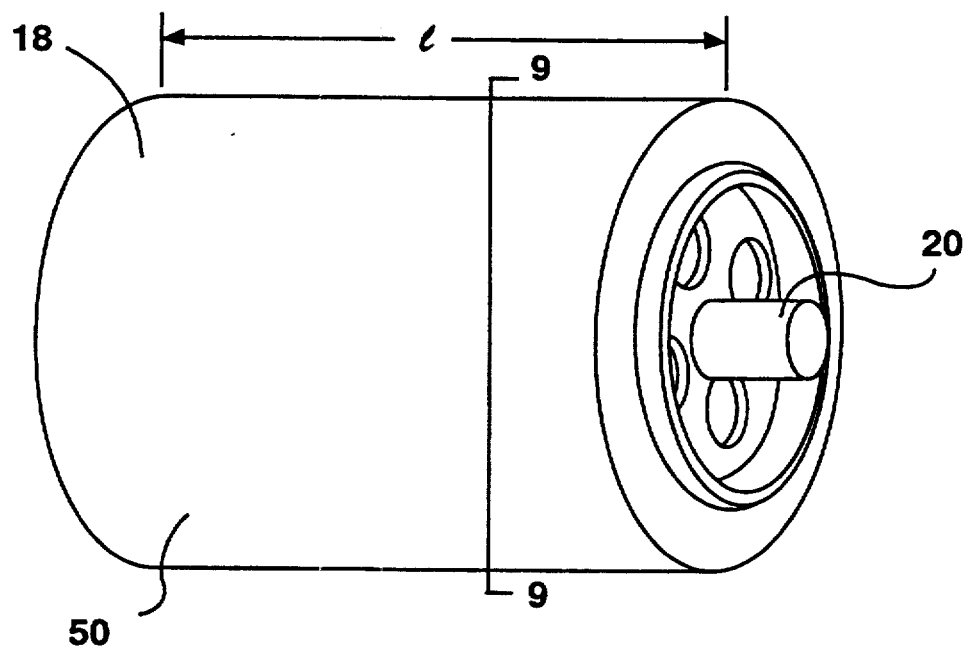

Another continuous skin is wound over top outer longitudinal stringers 46 and outer circumferential bands 48, now referring to FIG. 8, which shows the completion of cylinder workpiece 18 as a double-layered, translated rib-stiffened composite cylinder. Here, a ninth fibrous material is wound circumferentially around the cylindrical shape defined by the outer surfaces of outer longitudinal stringers 46 and outer circumferential bands 48 so as to form outer skin 50 having an outer surface defining a cylindrical shape which is coaxial with mandrel 20.

Accordingly, in this example a translated double rib-stiffened composite cylinder having a hollow core has been fabricated. This composite cylinder comprises: inner skin 22; a plurality of inner circumferential ribs 24 located radially outwardly adjacent to inner skin 22 and spaced apart longitudinally; a pair of inner pin rings 26 located at the axial ends of composite cylinder workpiece 18, one inner pin ring 26 at each axial end, each inner pin ring 26 having an inner ring 28 portion and a plurality of inner pins 30 spaced apart circumferentially and projecting radially from inner ring 28; a plurality of inner longitudinal stringers 32 located radially outwardly adjacent to inner circumferential ribs 24, inner longitudinal stringers 32 engaged with inner pins 30 and spaced apart circumferentially and correspondingly with inner pins 30; a pair of inner circumferential bands 34 located radially outwardly adjacent to inner longitudinal stringers 32 and longitudinally inwardly adjacent to inner pin rings 26; intermediate skin 36 located radially outwardly adjacent to inner circumferential bands 34 and inner longitudinal stringers 32; a plurality of outer circumferential ribs 48 located radially outwardly adjacent to intermediate skin 36, outer circumferential ribs 48 spaced apart longitudinally and staggeringly with respect to inner circumferential ribs 24; a pair of outer pin rings 40 located at the axial ends of composite cylinder workpiece 18, one outer pin ring 40 at each axial end, each outer pin ring 40 having an outer ring 42 portion and a plurality of outer pins 44 spaced apart circumferentially and projecting radially from outer ring 42; a plurality of outer longitudinal stringers 46 located radially outwardly adjacent to outer circumferential ribs 38, outer longitudinal stringers 46 engaged with outer pins 44 and spaced apart circumferentially and correspondingly with outer pins 44; a pair of outer circumferential bands 48 located radially outwardly adjacent to outer longitudinal stringers 46 and longitudinally inwardly adjacent to outer pin rings 40; and outer skin 50 located radially outwardly adjacent to outer circumferential bands 48 and outer longitudinal stringers 46.

It is reemphasized that the composite cylinder in accordance with the present invention is a translated multiple rib-stiffened composite cylinder having any plural number of ribbed layers. Hence, appropriate repetition of steps in accordance with this invention succeeds in conversion of the completed double-layered, translated rib-stiffened composite cylinder in the above example to a triple-layered cylinder, for example, which further comprises: a plurality of first additional outer circumferential ribs located radially outwardly adjacent to outer skin 50 and spaced apart longitudinally and staggeringly with respect to outer circumferential ribs; a pair of first additional outer pin rings located at the axial ends of cylinder workpiece 18, one first additional outer pin ring at each axial end, each first additional outer pin ring having a ring portion and a plurality of pins spaced apart circumferentially and projecting radially from the ring portion; a plurality of first additional outer longitudinal stringers located radially outwardly adjacent to the first additional outer circumferential ribs, the first additional outer longitudinal stringers engaged with the pins of the first additional outer pin rings and spaced apart circumferentially and correspondingly with the pins of the first additional outer pin rings; a pair of first additional outer bands located radially outwardly adjacent to the first additional outer longitudinal stringers and longitudinally inwardly adjacent to the first additional outer pin rings; and a first additional outer skin located radially outwardly adjacent to the first additional outer bands and the first additional outer longitudinal stringers.

Accordingly, in order to add each succeeding ribbed layer to cylinder workpiece 18, steps pertaining to circumferential winding of ribs, positioning of pin rings, longitudinal winding of longitudinal stringers, circumferential winding of bands, and circumferential winding of a skin, are appropriately repeated in accordance with this invention. Each repetition of steps forms a next outer layer of the composite cylinder, each next outer layer being radially outward of the previous other layer, the previous outer layer being the radially outermost outer layer prior to repetition of these steps. The previous outer layer includes previous circumferential ribs, previous pin rings, previous longitudinal stringers, previous bands, and a previous outer skin; the next outer layer includes the next circumferential ribs, the next pin rings, the next longitudinal stringers, the next bands, and the next outer skin, the next circumferential ribs spaced apart longitudinally and staggeringly with respect to the previous circumferential ribs.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A translated multiple rib-stiffened composite cylinder having a hollow core, said composite cylinder comprising:
   a cylindrical inner skin;
   a plurality of inner circumferential ribs located radially outwardly adjacent to said inner skin and spaced apart longitudinally;
   a pair of inner pin rings located at the axial ends of said composite cylinder, one said inner pin ring at each axial end, each said inner pin ring having a ring portion and a plurality of pins spaced apart circumferentially and projecting radially from said ring portion;
   a plurality of inner longitudinal stringers located radially outwardly adjacent to said inner circumferential ribs, said inner longitudinal stringers engaged with said pins of said inner pin rings and spaced apart circumferentially and correspondingly with said pins of said inner pin rings;
   a pair of inner bands located radially outwardly adjacent to said inner longitudinal stringers and longitudinally inwardly adjacent to said first pin rings;
   an intermediate skin located radially outwardly adjacent to said inner bands and said inner longitudinal stringers;
   a plurality of outer circumferential ribs located radially outwardly adjacent to said intermediate skin, said outer circumferential ribs spaced apart longitudinally and staggeringly with respect to said inner circumferential ribs;
   a pair of outer pin rings located at the axial ends of said composite cylinder, one said outer pin ring at each axial end, each said outer pin ring having a ring portion and a plurality of pins spaced apart circumferentially and projecting radially from said ring portion;
   a plurality of outer longitudinal stringers located radially outwardly adjacent to said outer circumferential ribs, said outer longitudinal stringers engaged with said pins of said outer pin rings and spaced apart circumferentially and correspondingly with said pins of said outer pin ring;
   a pair of outer bands located radially outwardly adjacent to said outer longitudinal stringers and longitudinally inwardly adjacent to said outer pin rings;
   an outer skin located radially outwardly adjacent to said outer bands and said outer longitudinal stringers.

2. A composite cylinder as in claim 1, wherein said ring portion of said inner pin ring is substantially flush with said inner circumferential ribs.

3. A composite cylinder as in claim 1, wherein said ring portion of said outer pin ring is substantially flush with said outer circumferential ribs.

4. A composite cylinder as in claim 1, further comprising:
   a plurality of first additional outer circumferential ribs located radially outwardly adjacent to said outer skin, said first additional outer circumferential ribs spaced apart longitudinally and staggeringly with respect to said outer circumferential ribs;
   a pair of first additional outer pin rings located at the axial ends of said composite cylinder, one said first additional outer pin ring at each axial end, each said first additional outer pin ring having a ring portion and a plurality of pins spaced apart circumferentially and projecting radially from said ring portion;
   a plurality of first additional outer longitudinal stringers located radially outwardly adjacent to said first additional outer circumferential ribs, said first additional outer longitudinal stringers engaged with said pins of said first additional outer pin rings and spaced apart circumferentially and correspondingly with said pins of said first additional outer pin rings;
   a pair of first additional outer bands located radially outwardly adjacent to said first additional outer longitudinal stringers and longitudinally inwardly adjacent to said first additional outer pin rings;
   a first additional outer skin located radially outwardly adjacent to said first additional outer bands and said first additional outer longitudinal stringers.

5. A composite cylinder as in claim 4, further comprising:
   a plurality of second additional outer circumferential ribs located radially outwardly adjacent to said first additional outer skin, said second additional outer circumferential ribs spaced apart longitudinally and staggeringly with respect to said first additional outer circumferential ribs;
   a pair of second additional outer pin rings located at the axial ends of said composite cylinder, one said second additional outer pin ring at each axial end, each said second additional outer pin ring having a ring portion and a plurality of pins spaced apart circumferentially and projecting radially from said ring portion;
   a plurality of second additional outer longitudinal stringers located radially outwardly adjacent to said second additional outer circumferential ribs, said second additional outer longitudinal stringers engaged with said pins of said second additional outer pin rings and spaced apart circumferentially and correspondingly with said pins of said second additional outer pin rings;

a pair of second additional outer bands located radially outwardly adjacent to said second additional outer longitudinal stringers and longitudinally inwardly adjacent to said second additional outer pin rings;

a second additional outer skin located radially outwardly adjacent to said second additional outer bands and said second additional outer longitudinal stringers.

6. A composite cylinder as in claim 5, further comprising:

a plurality of third additional outer circumferential ribs located radially outwardly adjacent to said second additional outer skin, said third additional outer circumferential ribs spaced apart longitudinally and staggeringly with respect to said second additional outer circumferential ribs;

a pair of third additional outer pin rings located at the axial ends of said composite cylinder, one said third additional outer pin ring at each axial end, each said third additional outer pin ring having a ring portion and a plurality of pins spaced apart circumferentially and projecting radially from said ring portion;

a plurality of third additional outer longitudinal stringers located radially outwardly adjacent to said third additional outer circumferential ribs, said third additional outer longitudinal stringers engaged with said pins of said third additional outer pin rings and spaced apart circumferentially and correspondingly with said pins of said third additional outer pin rings;

a pair of third additional outer bands located radially outwardly adjacent to said third additional outer longitudinal stringers and longitudinally inwardly adjacent to said third additional outer pin rings;

a third additional outer skin located radially outwardly adjacent to said third additional outer bands and said third additional outer longitudinal stringers.

7. A composite cylinder as in claim 6, further comprising:

a plurality of fourth additional outer circumferential ribs located radially outwardly adjacent to said third additional outer skin, said fourth additional outer circumferential ribs spaced apart longitudinally and staggeringly with respect to said third additional outer circumferential ribs;

a pair of fourth additional outer pin rings located at the axial ends of said composite cylinder, one said fourth additional outer pin ring at each axial end, each said fourth additional outer pin ring having a ring portion and a plurality of pins spaced apart circumferentially and projecting radially from said ring portion;

a plurality of fourth additional outer longitudinal stringers located radially outwardly adjacent to said fourth additional outer circumferential ribs, said fourth additional outer longitudinal stringers engaged with said pins of said fourth additional outer pin rings and spaced apart circumferentially and correspondingly with said pins of said fourth additional outer pin rings;

a pair of fourth additional outer bands located radially outwardly adjacent to said fourth additional outer longitudinal stringers and longitudinally inwardly adjacent to said fourth additional outer pin rings;

a fourth additional outer skin located radially outwardly adjacent to said fourth additional outer bands and said fourth additional outer longitudinal stringers.

8. A composite cylinder as in claim 7, further comprising:

a plurality of fifth additional outer circumferential ribs located radially outwardly adjacent to said fourth additional outer skin, said fifth additional outer circumferential ribs spaced apart longitudinally and staggeringly with respect to said fourth additional outer circumferential ribs;

a pair of fifth additional outer pin rings located at the axial ends of said composite cylinder, one said fifth additional outer pin ring at each axial end, each said fifth additional outer pin ring having a ring portion and a plurality of pins spaced apart circumferentially and projecting radially from said ring portion;

a plurality of fifth additional outer longitudinal stringers located radially outwardly adjacent to said fifth additional outer circumferential ribs, said fifth additional outer longitudinal stringers engaged with said pins of said fifth additional outer pin rings and spaced apart circumferentially and correspondingly with said pins of said fifth additional outer pin rings;

a pair of fifth additional outer bands located radially outwardly adjacent to said fifth additional outer longitudinal stringers and longitudinally inwardly adjacent to said fifth additional outer pin rings;

a fifth additional outer skin located radially outwardly adjacent to said fifth additional outer bands and said fifth additional outer longitudinal stringers.

9. A composite cylinder as in claim 4, wherein said ring portion of said first additional outer pin ring is substantially flush with said first additional outer circumferential ribs.

10. A composite cylinder as in claim 5, wherein said ring portion of said second additional outer pin ring is substantially flush with said second additional outer circumferential ribs.

11. A composite cylinder as in claim 6, wherein said ring portion of said third additional outer pin ring is substantially flush with said third additional outer circumferential ribs.

12. A composite cylinder as in claim 7, wherein said ring portion of said fourth additional outer pin ring is substantially flush with said fourth additional outer circumferential ribs.

13. A composite cylinder as in claim 8, wherein said ring portion of said fifth additional outer pin ring is substantially flush with said fifth additional outer circumferential ribs.

14. A composite cylinder as in claim 1, further comprising additional ribbed layers, wherein each ribbed layer of said cylinder includes a corresponding combination of one said plurality of outer circumferential ribs, one said pair of outer pin rings, one said plurality of outer longitudinal stringers, one said pair of outer bands, and one said outer skin.

* * * * *